United States Patent
Han et al.

(10) Patent No.: US 12,446,102 B2
(45) Date of Patent: Oct. 14, 2025

(54) METHOD AND APPARATUS FOR SIDELINK DRX OPERATION

(71) Applicant: Lenovo (Beijing) Ltd., Haidian (CN)

(72) Inventors: Jing Han, Beijing (CN); Lianhai Wu, Beijing (CN); Ran Yue, Beijing (CN); Haiming Wang, Beijing (CN); Jie Hu, Beijing (CN); Jie Shi, Beijing (CN)

(73) Assignee: Lenovo (Beijing) Ltd., Beijing (CN)

( * ) Notice: Subject to any disclaimer, the term of this patent is extended or adjusted under 35 U.S.C. 154(b) by 375 days.

(21) Appl. No.: 17/927,587

(22) PCT Filed: Jun. 12, 2020

(86) PCT No.: PCT/CN2020/095807
§ 371 (c)(1),
(2) Date: Nov. 23, 2022

(87) PCT Pub. No.: WO2021/248450
PCT Pub. Date: Dec. 16, 2021

(65) Prior Publication Data
US 2023/0209644 A1    Jun. 29, 2023

(51) Int. Cl.
*H04W 4/00* (2018.01)
*H04L 1/1829* (2023.01)
*H04W 76/28* (2018.01)
*H04W 92/18* (2009.01)

(52) U.S. Cl.
CPC .......... *H04W 76/28* (2018.02); *H04L 1/1848* (2013.01); *H04W 92/18* (2013.01)

(58) Field of Classification Search
CPC ................................................ H04L 1/1851
See application file for complete search history.

(56) References Cited

U.S. PATENT DOCUMENTS

| | | | |
|---|---|---|---|
| 11,895,651 B2 * | 2/2024 | Chae | H04W 72/20 |
| 2019/0174411 A1 | 6/2019 | Xu et al. | |
| 2019/0182799 A1 | 6/2019 | Youngdae et al. | |
| 2019/0215896 A1 * | 7/2019 | Zhou | H04B 7/0426 |
| 2019/0215897 A1 * | 7/2019 | Babaei | H04W 76/28 |
| 2019/0254013 A1 | 8/2019 | Chang et al. | |
| 2020/0304968 A1 | 9/2020 | Lee et al. | |

(Continued)

FOREIGN PATENT DOCUMENTS

| | | | | |
|---|---|---|---|---|
| CA | 3065550 A1 * | 12/2018 | | H04W 52/362 |
| CN | 101505502 A | 8/2009 | | |

(Continued)

OTHER PUBLICATIONS

20940472 , "Extended European Search Report", EP Application No. 20940472, Jun. 4, 2024, 14 pages.

(Continued)

*Primary Examiner* — Elisabeth Benoit Magloire
(74) *Attorney, Agent, or Firm* — FIG. 1 Patents

(57) ABSTRACT

Embodiments of the present application are directed to a method and apparatus for sidelink DRX operation. An exemplary method may include: configuring DRX information for sidelink, wherein the DRX information includes a value of DRX on-duration timer, a DRX cycle, and at least one DRX offset value; and starting the DRX on-duration timer from a beginning position based on the DRX cycle and the DRX offset value.

15 Claims, 6 Drawing Sheets

(56) References Cited

U.S. PATENT DOCUMENTS

| | | | | |
|---|---|---|---|---|
| 2021/0227464 A1* | 7/2021 | Kung | .................... | H04W 76/14 |
| 2022/0217740 A1* | 7/2022 | Park | ......................... | H04L 5/00 |
| 2022/0287044 A1* | 9/2022 | Yoshioka | .............. | H04L 5/0053 |
| 2022/0330283 A1* | 10/2022 | Park | ...................... | H04W 76/28 |
| 2023/0189389 A1* | 6/2023 | Hui | ...................... | H04L 1/1812 370/329 |
| 2023/0328840 A1* | 10/2023 | Cheng | .................. | H04W 8/005 370/329 |

FOREIGN PATENT DOCUMENTS

| | | | | | |
|---|---|---|---|---|---|
| CN | 108353358 | A | | 7/2018 | |
| CN | 111096026 | A | | 5/2020 | |
| CN | 113497681 | A | * | 10/2021 | ............ H04L 1/1848 |
| CN | 113453317 | B | * | 1/2024 | ........ H04W 52/0248 |
| WO | 2012097690 | A1 | | 7/2012 | |
| WO | 2017078783 | A1 | | 5/2017 | |
| WO | 2017171477 | A1 | | 10/2017 | |
| WO | 2018064477 | A1 | | 4/2018 | |
| WO | 2020042825 | A1 | | 3/2020 | |
| WO | 2020060890 | A1 | | 3/2020 | |
| WO | 2020091346 | A1 | | 5/2020 | |
| WO | 2020107346 | A1 | | 6/2020 | |

OTHER PUBLICATIONS 202080101947.5, "Foreign Office Action", CN Application No. 202080101947.5, Aug. 31, 2024, 18 pages.

Intel Corporation, ITL, "DRX in sidelink", 3GPP TSG RAN WG2#97, R2-1701309, Athens, Greece [retrieved Dec. 15, 2022]. Retrieved from the Internet <https://www.3gpp.org/ftp/tsg_ran/WG2_RL2/TSGR2_97/Docs/>., Feb. 2017, 2 Pages.

PCT/CN2020/095807, "International Preliminary Report on Patentability", PCT Application No. PCT/CN2020/095807, Dec. 22, 2022, 6 pages.

PCT/CN2020/095807, "International Search Report and Written Opinion", PCT Application No. PCT/CN2020/095807, Mar. 10, 2022, 7 pages.

20940472.2, "Communication Pursuant to Rule 164(1) EPC", EP Application No. 20940472.2 Communication Pursuant to Rule 164(1) EPC, Mar. 11, 2024, 17 pages.

Huawei, et al., "Draft CR on TS 38.321 on the remaining MAC Open issues for 5G V2X with NR SL", 3GPP TSG-RAN WG2 Meeting #109-bis electronic, R2-20xxxxx. Retrieved from the Internet <https://www.3gpp.org/ftp/TSG_RAN/WG2_RL2/TSGR2_109bis-e/Docs/?sortby=sizerev>, Apr. 2020, 20 pages.

"Foreign Office Action", CN Application No. 202080101947.5, Jan. 15, 2025, 23 pages.

"Foreign Office Action", CN Application No. 202080101947.5, Jun. 21, 2025, 30 pages.

"Foreign Office Action", CN Application No. 20208010947.5, Aug. 18, 2025, 10 pages.

Intel Corporation, "Introduction of DRX over PC5", 3GPP TSG RAN WG2 Meeting #95bis, R2-166255, Kaohsiung, Oct. 2016, 2 pages.

NTT Docomo, et al., "Addition of new Drx Tc 7.1.1.5.5 for short DRX configured and Long DRX command Mac Ce is received", 3GPP TSG-RAN5 Meeting #87-e, R5-202140, Electronic Meeting, May 2020, 8 pages.

* cited by examiner

METHOD AND APPARATUS FOR SIDELINK DRX OPERATION

TECHNICAL FIELD

Embodiments of the present application generally relate to wireless communication technology, and especially to a method and apparatus for sidelink discontinuous reception (DRX) operation.

BACKGROUND

Sidelink enables a direct communication between UEs in proximity, and data does not need to go through a base station (BS) or a core network. For example, in the case that a UE and another UE are relatively close to each other, a radio link or a sidelink can be established to provide Device-to-Device (D2D) communication. The term "sidelink" refers to a direct radio link for communication among devices, as opposed to communication via the cellular infrastructure (uplink and downlink). The "sidelink" is also referred to as a D2D link. D2D communication may be used in any suitable telecommunication network in accordance with various standards. The network may configure a resource pool for performing the D2D operation to the UE.

D2D operation may provide various advantages, for example, a relatively high transfer rate, a relatively low delay, etc. Moreover, in D2D operation, traffic concentrated on a base station can be distributed. Furthermore, D2D UE may function as a relay to extend coverage of a base station.

Currently, D2D communication has evolved into vehicle-to-anything (V2X) communication in the Long Term Evolution (LTE) sidelink, and has been introduced into 5G wireless communication technology. V2X communication encompasses communications involving vehicles as message sources or destinations.

In RAN #86 meeting, a sidelink enhancement work item is agreed. The necessity of sidelink enhancement has been identified. For V2X and public safety, the service requirements and operation scenarios are not fully supported in Release 16 (R16) due to the time limitation.

Power saving enables UEs with battery constraint to perform sidelink operations in a power efficient manner. NR sidelink in R16 is designed based on the assumption of "always-on" when a UE operates sidelink, e.g., only focusing on UEs installed in vehicles with sufficient battery capacity. Solutions for power saving in Release 17 (R17) are required for vulnerable road users (VRUs) in V2X use cases and for UEs in public safety and commercial use cases where power consumption in the UEs needs to be minimized.

Accordingly, one objective for power saving in R17 is achieved by performing sidelink DRX. DRX refers to a working mode for saving power consumption of a UE. For example, generally, in the DRX mode, the UE alternates between an active state and a sleep state (or an inactive state). The UE only turns on the receiver to monitor and receive control information or data when it is in the active state, and turns off the receiver to stop receiving the control information or data when it is in the sleep state.

Hence, how to realize the above objective to provide a method for sidelink DRX operation for NR V2X needs to be considered.

SUMMARY OF THE APPLICATION

Embodiments of the present application provide a method and apparatus for sidelink DRX operation.

An embodiment of the present application provides a method. The method may include: configuring DRX information for sidelink, wherein the DRX information includes a value of DRX on-duration timer, a DRX cycle, and at least one DRX offset value; and starting the DRX on-duration timer from a beginning position based on the DRX cycle and the DRX offset value.

In an embodiment of the present application, the method may further include: counting time for the DRX on-duration timer in time domain sequently only on resources in a configured resource pool from the beginning position until reaching the value of the DRX on-duration timer.

In an embodiment of the present application, the DRX cycle is a long DRX cycle, and the beginning position is determined by the following equation:

beginning position=beginning subframe+sl-drx-Slot-Offset

[system frame number(SFN)×10)+subframe number] modulo(sl-drx-LongCycle)=sl-drx-StartOffset wherein SFN and subframe number are used to determine the beginning subframe, and the DRX on-duration timer is started after sl-drx-SlotOffset from the beginning subframe, wherein sl-drx-StartOffset is a DRX start offset value and sl-drx-SlotOffset is a DRX slot offset value.

In an embodiment of the present application, the method may further include renumbering resources in a configured resource pool to be identified by virtual SFN(s) and virtual subframe numbers, and applying the virtual SFN(s) and virtual subframe numbers to the equation.

In an embodiment of the present application, the DRX offset value is an offset value of the beginning position relative to a start position of the configured resource pool.

An embodiment of the present application provides a method. The method may include: configuring DRX functionality for sidelink, wherein the DRX functionality includes a definition of active time for a UE; and monitoring physical sidelink control channel (PSCCH) continuously when the UE is in the active time.

In an embodiment of the present application, the active time includes a time while one of sl-drx-onDurationTimer, sl-drx-InactivityTimer and sl-drx-RetransmissionTimer is running.

In an embodiment of the present application, the active time includes a time after transmitting a request for requesting information until receiving the requested information. In an example, the requested information is sidelink-channel state information (SL-CSI). The active time includes a time while a DRX sidelink-channel state information (SL-CSI) timer is running, wherein the value of the DRX SL-CSI timer is configured by higher layer signaling or determined by SL-CSI latency bound. In another example, the method may further include: starting the DRX SL-CSI timer after transmitting the SL-CSI request pulls time T, wherein the time T is configured by higher layer or specified directly, or the time T is zero.

Another embodiment of the present application provides a method. The method may include: configuring DRX information for sidelink, wherein the DRX information includes a value of a DRX inactivity timer; and starting the DRX inactivity timer when a received sidelink control information (SCI) indicates a new transmission on sidelink for an interest destination.

In an embodiment of the present application, starting the DRX inactivity timer comprising: starting the DRX inactivity timer in a first symbol after the end of a first stage SCI reception. Furthermore, stopping the DRX inactivity timer when identifying a medium access control (MAC) protocol data unit (PDU) of the new transmission is not for a UE itself.

Another embodiment of the present application provides a method. The method may include: configuring DRX information for sidelink, wherein the DRX information includes a value of hybrid automatic repeat request (HARQ) round trip time (RTT) timer and a value of HARQ retransmission timer; and starting the HARQ RTT timer and stopping the HARQ retransmission timer when receiving an SCI indicating a sidelink transmission for an interest destination.

In an embodiment of the present application, the method may further include: starting the HARQ retransmission timer after the HARQ RTT timer expires and a transport block (TB) associated with the sidelink transmission is not successfully decoded.

In an embodiment of the present application, the SCI further indicates a plurality of reserved resources for transmission and retransmission of the TB, and the method may further include: starting the HARQ RTT timer after a last reserved resource in the plurality of reserved resources ends.

In another embodiment of the present application, the SCI further indicates a plurality of reserved resources for transmission of a different TB, and the method may further include: storing sidelink grant in the SCI in medium access control (MAC) layer; and if a MAC PDU is received in the stored sidelink grant for a new transmission of a TB, starting the HARQ RTT timer and stopping the HARQ retransmission timer for a corresponding HARQ process.

Another embodiment of the present application provides an apparatus. The apparatus may include at least one non-transitory computer-readable medium having computer executable instructions stored therein; at least one receiver; at least one transmitter; and at least one processor coupled to the at least one non-transitory computer-readable medium, the at least one receiver and the at least one transmitter. The computer executable instructions are programmed to implement the above method with the at least one receiver, the at least one transmitter and the at least one processor.

The embodiments of the present application can align sidelink DRX wake-up time or active time among the UEs on sidelink by DRX timers defined on sidelink.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G. It is contemplated that along with developments of network architectures and new service scenarios, all embodiments in the present application are also applicable to similar technical problems; and moreover, the terminologies recited in the present application may change, which should not affect the principle of the present application.

Figure 1:
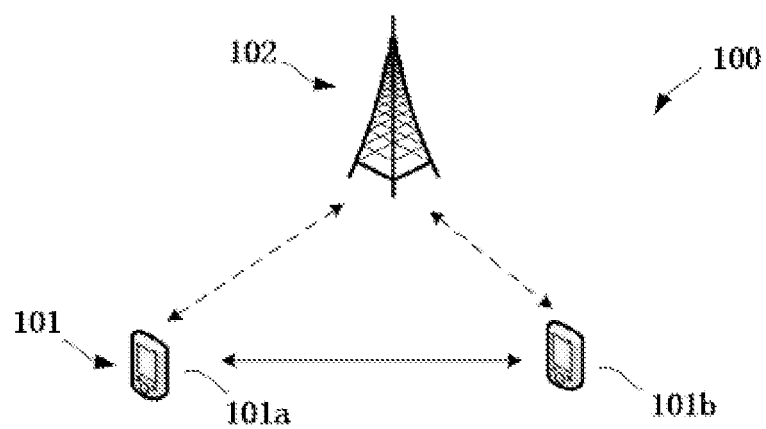
FIG. 1 illustrates a wireless communication system according to some embodiments of the present application.

FIG. 1 illustrates a schematic diagram of a wireless communication system in accordance with some embodiments of the present application.

As shown in FIG. 1, a wireless communication system 100 includes at least one user equipment (UE) 101 and at least one base station (BS) 102. In particular, the wireless communication system 100 includes two UEs 101 (e.g., UE 101*a* and UE 101*b*) and one BS 102 for illustrative purpose. Although a specific number of UEs 101 and BS 102 are depicted in FIG. 1, it is contemplated that any number of UEs 101 and BSs 102 may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present application, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network.

In some embodiments of the present application, UE is pedestrian UE (P-UE or PUE) or cyclist UE. In some embodiments of the present application, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate directly with BSs 102 via LTE or NR Uu interface.

In some embodiments of the present application, each of the UE(s) 101 may be deployed an internet of things (IoT) application, an enhanced mobile broadband (eMBB) application and/or a ultra-reliable and low latency communications (URLLC) application. For instance, UE 101a may implement an IoT application and may be named as an IoT UE, while UE 101b may implement an eMBB application and/or a URLLC application and may be named as an eMBB UE, an URLLC UE, or an eMBB/URLLC UE. It is contemplated that the specific type of application(s) deployed in the UE(s) 101 may be varied and not limited.

According to some embodiments of FIG. 1, UE 101a functions as transmitting (Tx) UE, and UE 101b functions as receiving (Rx) UE. UE 101a may exchange V2X messages with UE 101b through a sidelink, for example, PC5 interface as defined in 3GPP TS 23.303. UE 101a may transmit information or data to other UE(s) within the V2X communication system, through sidelink unicast, sidelink groupcast, or sidelink broadcast. For instance, UE 101a transmits data to UE 101b in a sidelink unicast session. UE 101a may transmit data to UE 101b and other UEs in a groupcast group (not shown in FIG. 1) by a sidelink groupcast transmission session. Also, UE 101a may transmit data to UE 101b and other UEs (not shown in FIG. 1) by a sidelink broadcast transmission session.

Alternatively, according to some other embodiments of FIG. 1, UE 101b functions as Tx UE and transmits V2X messages, UE 101a functions as Rx UE and receives the V2X messages from UE 101b.

Both UE 101a and UE 101b in the embodiments of FIG. 1 may transmit information to BS 102 and receive control information from BS 102, for example, via LTE or NR Uu interface. BS(s) 102 may be distributed over a geographic region. In certain embodiments of the present application, each of BS(s) 102 may also be referred to as an access point, an access terminal, a base, a base unit, a macro cell, a Node-B, an evolved Node B (eNB), a gNB, a Home Node-B, a relay node, or a device, or described using other terminology used in the art. The BS(s) 102 is generally a part of a radio access network that may include one or more controllers communicably coupled to one or more corresponding BS(s) 102.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3GPP-based network, a 3GPP 5G network, a satellite communications network, a high altitude platform network, and/or other communications networks.

In some embodiments of the present application, the wireless communication system 100 is compatible with the 5G NR of the 3GPP protocol, where BS(s) 102 transmit data using an OFDM modulation scheme on the downlink (DL) and the UE(s) 101 transmit data on the uplink (UL) using a Discrete Fourier Transform-Spread-Orthogonal Frequency Division Multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

In some embodiments of the present application, BS(s) 102 may communicate using other communication protocols, such as the IEEE 802.11 family of wireless communication protocols. Further, in some embodiments of the present application, the BS(s) 102 may communicate over licensed spectrums, whereas in other embodiments, the BS(s) 102 may communicate over unlicensed spectrums. The present application is not intended to be limited to the implementation of any particular wireless communication system architecture or protocol. In yet some embodiments of present application, BS(s) 102 may communicate with UE(s) 101 using the 3GPP 5G protocols.

In NR system, DRX timers are maintained on Uu interface. The DRX is specified in section 5.7 in 3GPP TS38.321. Some paragraphs are given as follows:

In 3GPP TS38.321, on-duration timer on Uu interface is specified as follows:
1> if a DRX Command MAC CE or a Long DRX Command MAC CE is received:
  2> stop drx-onDurationTimer;
  2> stop drx-InactivityTimer.
. . .
1> if the Short DRX Cycle is used, and [(SFN×10)+ subframe number] modulo (drx-ShortCycle)=(drx-StartOffset) modulo (drx-ShortCycle):
  2> start drx-onDurationTimer after drx-SlotOffset from the beginning of the subframe.
1> if the Long DRX Cycle is used, and [(SFN×10)+ subframe number] modulo (drx-LongCycle)=drx-StartOffset:
  2> if DCP is configured for the active DL BWP:
    3> if DCP indication associated with the current DRX Cycle received from lower layer indicated to start drx-onDurationTimer, as specified in TS 38.213 [6]; or
    3> if all DCP occasion(s) in time domain, as specified in TS 38.213 [6], associated with the current DRX Cycle occurred in Active Time considering grants/assignments/DRX Command MAC CE/Long DRX Command MAC CE received and Scheduling Request sent until 4 ms prior to start of the last DCP occasion, or within BWP switching interruption length, or during a measurement gap; or
    3> if ps-Wakeup is configured with value true and DCP indication associated with the current DRX Cycle has not been received from lower layers:
      4> start drx-onDurationTimer after drx-SlotOffset from the beginning of the subframe.
  2> else:
    3> start drx-onDurationTimer after drx-SlotOffset from the beginning of the subframe.

In 3GPP TS38.321, a start condition for RTT timer and Retransmission timer on Uu interface is specified as follows:

```
1>if a MAC PDU is received in a configured downlink assignment:
    2>  start the drx-HARO-RTT-TimerDL for the corresponding HARQ process in
        the first symbol after the end of the corresponding transmission carrying the
        DL HARQ feedback;
    2>  stop the drx-RetransmissionTimerDL for the corresponding HARQ process.
1>if a MAC PDU is transmitted in a configured uplink grant:
    2>  start the drx-HARQ-RTT-TimerUL for the corresponding HARQ process in
        the first symbol after the end of the first repetition of the corresponding
        PUSCH transmission;
    2>  stop the drx-RetransmissionTimerUL for the corresponding HARQ process.
...
1>if the MAC entity is in Active Time:
    2>  monitor the PDCCH as specified in TS 38.213 [6];
    2>  if the PDCCH indicates a DL transmission:
        3>  start the drx-HARQ-RTT-TimerDL for the corresponding HARQ process in
            the first symbol after the end of the corresponding transmission carrying the
            DL HARQ feedback, regardless of LBT failure indication from lower
            layers;
        3>  stop the drx-RetransmissionTimerDL for the corresponding HARQ
            process.
        3>  if the PDSCH-to-HARQ_feedback timing indicate a non-numerical k1
            value as specified in TS 38.213 [6]:
            4>  start the drx-RetransmissionTimerDL in the first symbol after the
                PDSCH transmission for the corresponding HARQ process.
    2>  if the PDCCH indicates a UL transmission:
        3>  start the drx-HARQ-RTT-TimerUL for the corresponding HARQ process in
            the first symbol after the end of the first repetition of the corresponding
            PUSCH transmission, regardless of LBT failure indication from lower
            layers;
        3>  stop the drx-RetransmissionTimer UL for the corresponding HARQ
            process.
...
```

On the other hand, there are some modes of resource allocation in NR V2X. For example, mode 1 is where a base station schedules resource for sidelink transmission, and mode 2 (referred as NR V2X Mode-2) is where a UE autonomously selects the resource for sidelink transmission from a set of resources configured by the network.

RAN1 has agreed that NR V2X Mode-2 supports resource reservation not only for the same transport block (TB) but also for different TBs.

For example, for resource reservation for the same TB, in the 3GPP RAN1 #97 and RAN1 #98 meeting, some agreements are made as follows:

Agreements (RAN1 #97):

NR V2X Mode-2 supports resource reservation for feedback-based PSSCH retransmissions by signaling associated with a prior transmission of the same TB Agreements (RAN1 #98):

At least for mode 2, The maximum number of SL resources $N_{MAX}$ reserved by one transmission including current transmission is [2 or 3 or 4]

$N_{MAX}$ is the same regardless of whether HARQ feedback is enabled or disabled For resource reservation for different TBs, in the 3GPP RAN1 #99 meeting, some agreements are made as follows:

Agreements:

On a per resource pool basis, when reservation of a sidelink resource for an initial transmission of a TB at least by an SCI associated with a different TB is enabled:

A period is additionally signalled in SCI and the same reservation is applied with respect to resources indicated within $N_{MAX}$ within window W at subsequent periods A set of possible period values is the following: 0, [1:99], 100, 200, 300, 400, 500, 600, 700, 800, 900, 1000 ms <=4 bits are used in SCI to indicate a period An actual set of values is (pre-) configured As discussed above, one objective for power saving in R17 is for sidelink DRX, and corresponding working scope is as follows:

Sidelink DRX for broadcast, groupcast, and unicast [RAN2]

Define on- and off-durations in sidelink and specify the corresponding UE procedure Specify mechanism aiming to align sidelink DRX wake-up time among the UEs communicating with each other Specify mechanism aiming to align sidelink DRX wake-up time with Uu DRX wake-up time in an in-coverage UE.

Wherein, the alignment among UEs for sidelink DRX is important, so that data is not missed at Rx UE, and it needs to minimize Rx UE's power consumption as much as possible. The alignment for sidelink DRX not only needs to be considered between UEs communicating with each other, but also needs to be considered between Uu interface and sidelink.

In R16, groupcast and unicast communication were introduced for NR V2X, besides broadcast transmission. In embodiments of the present application, it needs to align sidelink DRX wake-up time (also referred to as "active time") among UEs on sidelink by DRX timers defined on sidelink.

Figure 2:
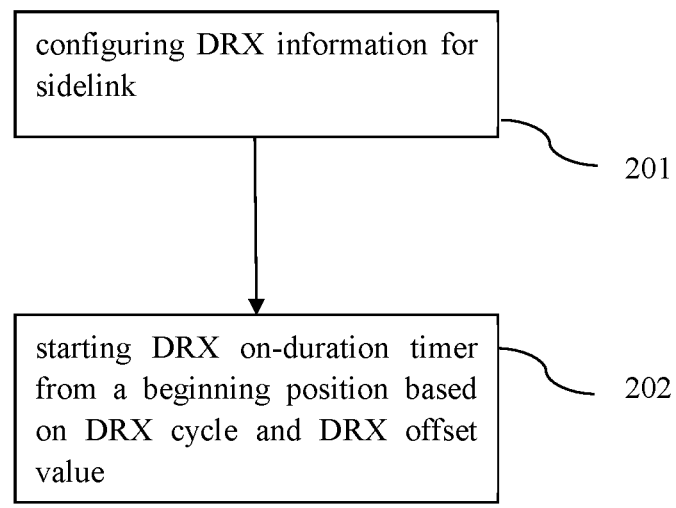
FIG. 2 illustrates a flow diagram illustrating a method for sidelink DRX operation according to an embodiment of the present application.

FIG. 2 illustrates a flow diagram illustrating a method for sidelink DRX operation according to an embodiment of the present application. The method illustrated in FIG. 2 may be implemented by a UE. It should be understood the method for the sidelink DRX operation in this embodiment may be used for broadcast, groupcast, and unicast.

As shown in FIG. 2, in step 201, a UE may configure DRX information for sidelink. For example, before step 201, the UE may receive the DRX information from a BS, and then perform DRX according to the DRX information. For example, the BS may transmit the DRX information by a higher layer signaling, radio resource control (RRC) signaling, especially, ConnectionReconfiguration or RRCConnection Setup or RRCConnectionReestablishment to the UE. For a second example, before step 201, the UE may determine the DRX information from pre-configuration in the UE, e.g. pre-configured sidelink parameters. For a third example, before step 201, the UE may receive the DRX information from another UE. For example, the other UE may transmit the DRX information by proximity-based communication 5 (PC5)-RRC signaling, e.g. RRCReconfigurationSidelink, RRCReconfigurationCompleteSidelink, etc.

The DRX information may include values of DRX timers, DRX cycle, and DRX offset value, or the like. For example, the DRX timers may include a DRX on-duration timer, a DRX inactivity timer, a HARQ round-trip time (RTT) timer, a DRX retransmission timer, or the like. The value of the DRX timers may be indicated by the number of slots or symbols or sub-milliseconds or milliseconds. The DRX cycle may include short DRX cycle (such as sl-drx-ShortCycle) and long DRX cycle (such as sl-drx-LongCycle). The DRX offset value may include a DRX start offset (sl-drx-StartOffset) and a DRX slot offset (sl-drx-SlotOffset).

For example, the value of the DRX on-duration timer is used to indicate the duration at the beginning of a DRX cycle, and can be used to indicate the minimum time length that the UE remains in the active (or wake up) state after entering the active state. The value of the DRX inactive timer can be used to indicate how long the UE remains active after receiving scheduling signaling of a physical sidelink control channel (PSCCH). The value of the HARQ RTT timer can be used to indicate the minimum amount of duration before a sidelink grant for HARQ retransmission is expected by the UE. The value of retransmission timer can be used to indicate the maximum duration until a sidelink grant for retransmission is received.

In an embodiment of the present application, a DRX timer e.g. a DRX on-duration timer may be introduced for UE(s) to monitor control information on sidelink.

For example, in step 202, the UE starts the DRX on-duration timer from a beginning position of the DRX on-duration timer based on the DRX cycle and the DRX offset value.

In an embodiment of the present application, the UE may determine a start subframe (or beginning subframe) based on the DRX start offset (sl-drx-StartOffset), and determine a starting time (or beginning position) of the DRX on-duration timer (sl-drx-onDurationTimer) in the start subframe based on the DRX slot offset (sl-drx-SlotOffset).

For example, if a long DRX cycle is used, and the beginning position is determined by the following equation:

beginning position=beginning subframe+sl-drx-SlotOffset

[system frame number(SFN)×10]+subframe number]
modulo(sl-drx-LongCycle)=sl-drx-StartOffset where SFN and subframe number are used to determine the beginning subframe, and the DRX on-duration timer is started after sl-drx-SlotOffset from the beginning subframe.

In some embodiments of the present application, multiple resource pools for a specific UE may be configured on the sidelink, each resource pool can be flexibly configured on time domain independently. The available resource can be used for sidelink may be not continuously on time domain. Besides, multiple resource pools on time domain may not be distributed evenly and periodically.

In an embodiment of the present application, after a DRX on-duration timer (such as sl-drx-onDurationTimer) is started according to the determined beginning position, the UE may count time for the DRX on-duration timer in time domain sequently only on the available resources in a configured resource pool from the beginning position until the DRX on-duration timer expires (that is, reaching the value or threshold of the DRX on-duration timer).

In particular, for example, it assumes that the sl-drx-onDurationTimer is started at T1, and the available resources in resource pool are started in T2, T3, T5 . . . , and then the sl-drx-onDurationTimer only counts time occupied by each available resource starting from T2, T3, T5 . . . where the available resources start respectively.

It should be understood that the above scheme for the DRX on-duration timer can be utilized similarly to the other sidelink DRX timers, e.g. inactivity timer, HARQ RTT timer, retransmission timer etc. on sidelink. For example, after these sidelink DRX timers are started at a determined starting position, these sidelink DRX timers may count in time domain sequently only on the available resources in the configured resource pool.

In another embodiment of the present application, the UE may renumber the available resources in the configured resource pool to be identified by virtual SFN(s) and virtual subframe number(s), and applies the virtual SFN(s) and virtual subframe number(s) to the above equation to determine the beginning position of the DRX on-duration timer on sidelink.

In particular, for example, it assumes that there are resources in: SFN=1 with subframe 1~10, SFN=2 with subframe 1~10, SFN=3 with subframe 1~10, wherein the available resources in the configured resource pool are in SFN=1 with subframe 3, 5, 6, 8, and in SFN=3 with subframe 2, 4, 5, 6. Then for the available resources, the virtual number can be defined: SFN_virtual=1 with subframe_virtual 1, 2, 3, 4 is for SFN=1 with subframe 3, 5, 6, 8; SFN_virtual=1 with subframe_virtual 5, 6, 7, 8 is for SFN=3 with subframe 2, 4, 5, 6. Then, the defined virtual SFN and virtual subframe number are applied to the above equation, to determine the beginning position of the DRX on-duration timer on sidelink.

In yet another embodiment of the present application, the DRX offset value is configured for sidelink DRX, and the DRX offset value configured for sidelink DRX is relative to the start position (or start point) of the configured resource pool. The DRX on-duration timer starts after the start position of resource pool plus the DRX offset value.

For example, the offset granularity of the DRX offset value could be based on subframe or based on slot or based on 1/32 ms. For example, if the resource pool is started at SFN=3 with subframe=4, and the DRX offset value is based on 1/32 ms and set to 4, then the DRX on-duration timer will be started after SFN=3 with subframe=4 with additional 4/32 ms.

Figure 3:
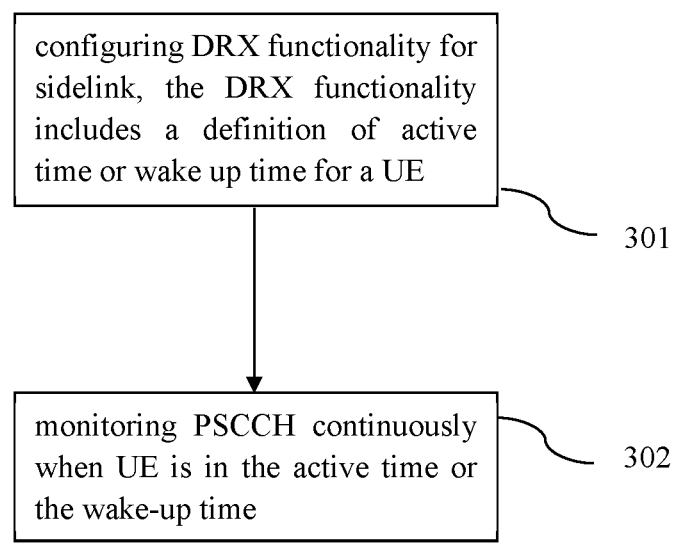
FIG. 3 illustrates a flow diagram illustrating another method for sidelink DRX operation according to an embodiment of the present application.

FIG. 3 illustrates a flow diagram illustrating another method for sidelink DRX operation according to an embodiment of the present application. The method illustrated in FIG. 3 may be implemented by a UE. The method for the sidelink DRX operation in this embodiment may be used for unicast.

As shown in FIG. 3, in step 301, a UE may configure DRX functionality for sidelink. The DRX functionality may include a definition of active time (or wake up time) for a UE. In an embodiment of the present application, when a sidelink DRX is configured, the active time (or the wake-up time) may include the time while one of a DRX on-duration timer (such as sl-drx-onDurationTimer), an DRX inactivity timer (such as sl-drx-InactivityTimer), and a DRX retransmission timer (such as sl-drx-RetransmissionTimer) is running.

In step 302, the UE monitors PSCCH continuously when the UE is in the active time or the wake-up time.

In some embodiments of the present application, the active time (or the wake-up time) may include the time after transmitting a request for requesting information until receiving the requested information. In an embodiment of the present application, in a sidelink-channel state information (SL-CSI) procedure, the requested information is SL-CSI.

For a SL-CSI procedure for sidelink DRX, the SL-CSI is requested by a Tx UE for power control, and the Tx UE needs to wake up to wait for SL-SCI report, so the Tx UE will monitor PSCCH until SL-CSI report is received from a peer UE. Therefore, the active time may include the time after a SL-CSI trigger (or a SL-CSI request) is sent on PSCCH, until a SL-CSI report is received from the peer UE.

In another embodiment of the present application, a new sidelink DRX timer which specifically controls the wake-up time or the active time for SL-CSI reception is introduced. For example, a sl-drx-CSI-timer is introduced. It should be understood that "sl-drx-CSI-timer" is just an examplary name of the new DRX timer, and the new DRX timer can be called another name.

When a SL-CSI trigger on PSCCH is sent to a peer UE for a specific unicast connection, the Tx UE starts the sl-drx-CSI-timer. When the sl-drx-CSI-timer is running, the Tx UE is in active time or wake-up time. After receiving a SL-CSI report from the peer UE for the specific unicast connection, the Tx UE stops the sl-drx-CSI-timer. In an example, the value of the sl-drx-CSI-timer may be configured by high layer. In another example, the value of the sl-drx-CSI-timer may be determined by SL-CSI latency bound. In yet another example, the sl-drx-CSI-timer is started after a SL-CSI trigger is sent on PSCCH plus time T, and the time T may be specified directly by the Tx UE, or configured by high layer, and the value of the time T may relate to the processing time of the peer UE. In another example, the value of the time T may be zero.

In addition, on sidelink, when transmitting a packet, a destination ID or source ID of the packet (MAC PDU) may be split to two parts, one part is in Layer 1 and the other part is in Layer 2. That is, destination ID in Layer 1 or source ID in Layer 1 is only part of a full destination ID or source ID, and thus a Rx UE cannot determine whether a received TB in the MAC PDU is for itself only based on the destination ID in Layer 1 and the source ID in Layer 1. The UE can only identify MAC PDU that for itself when TB is correctly decoded. Accordingly, the UE may start the DRX-inactivity timer wrongly. To solve that, embodiments of the present propose that the UE stops the DRX-inactivity timer on sidelink when the UE identifies the MAC PDU is not for itself.

Figure 4:
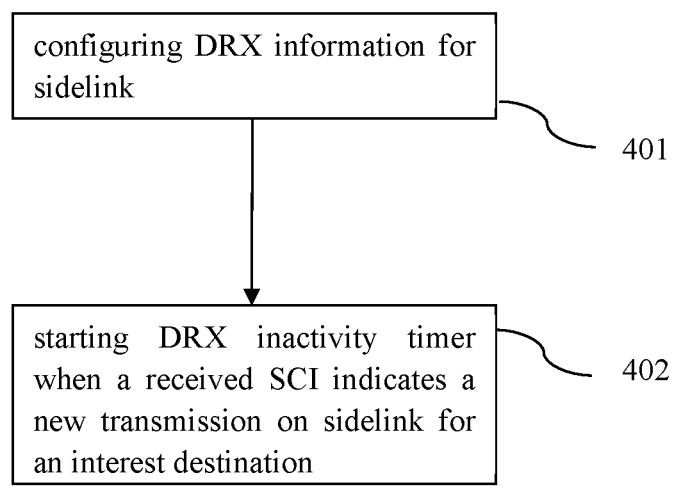
FIG. 4 illustrates a flow diagram illustrating another method for sidelink DRX operation according to an embodiment of the present application

Specifically, FIG. 4 illustrates a flow diagram illustrating another method for sidelink DRX operation according to an embodiment of the present application. The method illustrated in FIG. 4 may be implemented by a UE. It should be understood the method for the sidelink DRX operation may be used for broadcast, groupcast, and unicast.

As shown in FIG. 4, in step 401, a UE may configure DRX information for sidelink, wherein a DRX inactivity timer is introduced. The DRX information may include a value of the DRX inactivity timer.

In step 402, the UE starts (including restart) the DRX inactivity timer when a received SCI indicates a new transmission on sidelink for an interest destination.

The interest destination may indicate the destination of a packet that the UE wants to receive. For example, the high layer (such as, V2X layer) of the UE tells the UE the destination(s) of packet(s) that the UE needs to receive, and the destination (or called the interest destination) is represented by Destination Layer-2 identity (ID), so there may be one or more Destination Layer-2 IDs in the UE.

More explanations are provided hereafter. Firstly, in an example, which kind of TB is for the UE itself is determined by the following text:

"if the source (SRC) field of the decoded MAC PDU subheader is equal to the 16 MSB of any of the Source Layer-2 ID(s) of the UE for which the 8 least significant bit (LSB) are equal to the Source ID in the corresponding SCI, and if the destination (DST) field of the decoded MAC PDU subheader is equal to the 8 most significant bit (MSB) of any of the Destination Layer-2 ID(s) of the UE for which the 16 LSB are equal to the Destination ID in the corresponding SCI", and then such TB is considered for the UE itself. Otherwise, the TB is not for the UE itself.

Taking the Destination Layer-2 ID(s) as an example to be described in detail, the Destination Layer-2 ID has a total of 24 bits in which 16 bits are indicated in the SCI on PSCCH and 8 bits are indicated in the MAC PDU. In the case of receiving a packet by a Rx UE, the Rx UE first receives the SCI on PSCCH (referred as first stage SCI reception), and then checks whether the 16-bit Destination ID in the SCI matches the 16 LSB bits of the Destination Layer-2 ID that the Rx UE itself is interested in. If they are matching, the Rx UE continues to receive a MAC PDU on physical sidelink share channel (PSSCH), extracts the MAC PDU, and checks whether the 8 bits in the MAC PDU match the 8 MSB of the Destination Layer-2 ID that the UE itself is interested in. If they are matching, the Rx UE can determine that the MAC PDU is for itself.

In an embodiment, if the Rx UE receives a SCI indicating a new transmission for the interest destination, the UE will start or restart the DRX inactivity timer (sl-drx-InactivityTimer) in the first symbol after the end of the first stage SCI reception to receive the MAC PDU as the new transmission on PSSCH.

And then, during the DRX inactivity timer, after receiving and successfully decoding a TB in the MAC PDU on PSSCH and obtaining the full destination/source ID, if the Rx UE found that the obtained full destination/source ID is not in the interest destination/source list, it means that the TB is not for the UE itself. In this case, the Rx UE will stop the DRX inactivity timer. For example, after successfully decoding the TB and the decoded TB is not for the Rx UE itself, if the sl-drx-InactivityTimer is running, the UE stops the sl-drx-InactivityTimer. In another example, after successfully decoding the TB and the decoded TB is for the UE itself, if the sl-drx-InactivityTimer is running, the UE will let the sl-drx-InactivityTimer continue running until the timer expires.

Figure 5:
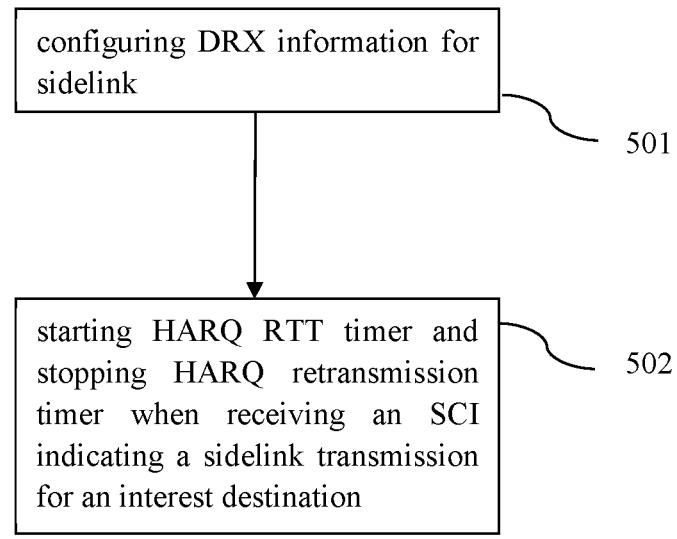
FIG. 5 illustrates a flow diagram illustrating another method for sidelink DRX operation according to an embodiment of the present application.

FIG. 5 illustrates a flow diagram illustrating another method for sidelink DRX operation according to an embodiment of the present application. The method illustrated in FIG. 5 may be implemented by a UE. It should be understood the method for the sidelink DRX operation in this embodiment may be used for broadcast, groupcast, and unicast.

As shown in FIG. 5, in step 501, a UE may configure DRX information for sidelink. In this embodiment, a HARQ RTT timer and a HARQ retransmission timer are introduced. The DRX information may include a value (or a threshold) of the HARQ RTT timer and a value (or a threshold) of the HARQ retransmission timer.

In step 502, the UE starts the HARQ RTT timer and stops the HARQ retransmission timer when receiving an SCI indicating a sidelink transmission for an interest destination. Furthermore, after the HARQ RTT timer expires and a TB associated with the sidelink transmission is not successfully decoded, the UE starts the HARQ retransmission timer.

As discussed above, NR V2X Mode-2 is where a UE autonomously selects the resource for sidelink transmission from a set of resources configured by the network. For NR V2X Mode-2, a Tx UE can indicate reserved sidelink resource(s) for same TB or different TB via a SCI.

In an embodiment, a Tx UE may indicate reserved sidelink resource(s) for the same TB via a SCI in NR V2X Mode-2, for example, the SCI may reserve multiple sidelink resources for transmission and retransmission of the same TB. And such reservation may be indicated by frequency resource assignment and time resource assignment field in the SCI.

In the case that a Rx UE receives the SCI from the Tx UE and the SCI indicates multiple reserved sidelink resources for transmission and retransmission of the same TB, the Rx UE will not start or restart the HARQ RTT timer until the last reserved resource in the multiple reserved sidelink resources ends. For example, sl-drx-HARQ-RTT-Timer is only started by the Rx UE after the last reserved resource indicated by frequency resource assignment and time resource assignment field in the SCI ends, and if HARQ feedback is enabled as indicated in the SCI.

In another embodiment, a Tx UE may indicate next reserved sidelink resource(s) for different TBs via a SCI in NR V2X Mode-2. For example, a Rx UE may receive a SCI indicating next multiple reserved sidelink resources for different TBs (which means a new transmission) in resource reservation period field from a Tx UE, and the Rx UE stores the sidelink grant indicated in the resource reservation period field in MAC layer.

Furthermore, if a MAC PDU is received by the Rx UE from a Tx UE in the stored sidelink grant for a new transmission, the Rx UE starts the HARQ RTT timer and stops the HARQ retransmission timer for a corresponding HARQ process. For example, the Tx UE may start the sl-drx-HARQ-RTT-Timer for the corresponding HARQ process in the first symbol after the end of the PSSCH transmission for the MAC PDU, and stop the sl-drx-RetransmissionTimer for the corresponding HARQ process.

Therefore, embodiments of the present application provides solutions for sidelink DRX operation for NR V2X, and the solutions can align sidelink DRX wake-up time or active time among the UEs on sidelink by DRX timers defined on sidelink.

Figure 6:
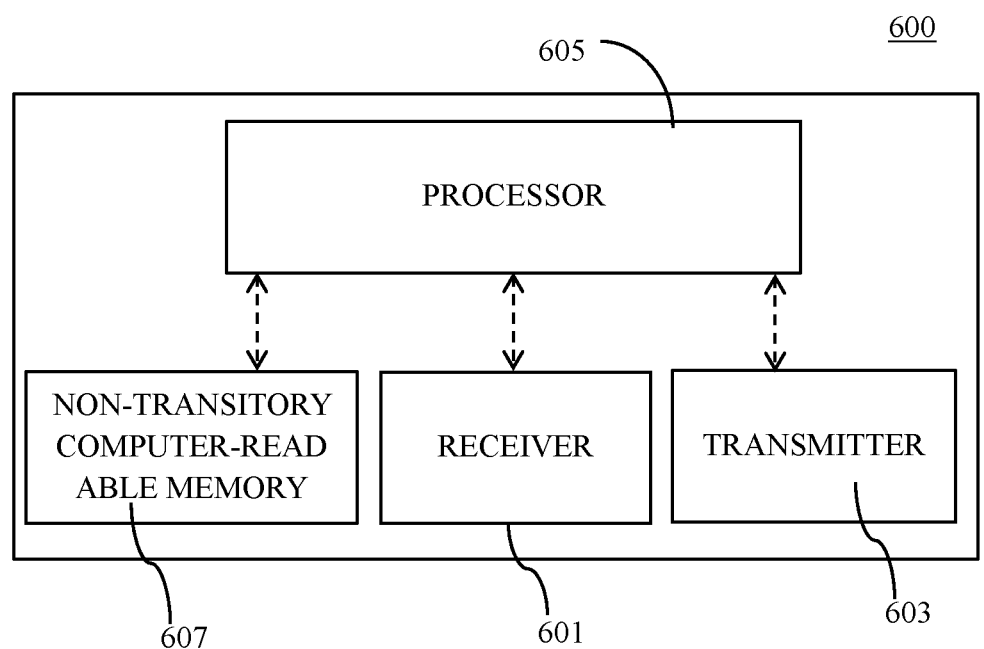
FIG. 6 illustrates an apparatus according to some embodiments of the present application.

FIG. 6 illustrates an apparatus according to some embodiments of the present application. In some embodiments of the present disclosure, the apparatus 600 may be a UE 101 as illustrated in FIG. 1 or other embodiments of the present application.

As shown in FIG. 6, the apparatus 600 may include a receiver 601, a transmitter 603, a processor 605, and a non-transitory computer-readable medium 607. The non-transitory computer-readable medium 607 has computer executable instructions stored therein. The processor 605 is configured to be coupled to the non-transitory computer readable medium 607, the receiver 601, and the transmitter 603. It is contemplated that the apparatus 600 may include more computer-readable mediums, receiver, transmitter and processors in some other embodiments of the present application according to practical requirements. In some embodiments of the present application, the receiver 601 and the transmitter 603 are integrated into a single device, such as a transceiver. In certain embodiments, the apparatus 600 may further include an input device, a memory, and/or other components.

In some embodiments of the present application, the non-transitory computer-readable medium 607 may have stored thereon computer-executable instructions to cause a processor to implement the method according to embodiments of the present application.

Persons skilled in the art should understand that as the technology develops and advances, the terminologies described in the present application may change, and should not affect or limit the principle and spirit of the present application.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A user equipment (UE) for wireless communication, comprising:
   at least one memory; and
   at least one processor coupled with the at least one memory and operable to cause the UE to:
   configure discontinuous reception (DRX) functionality for sidelink, wherein the DRX functionality includes a definition of active time for the UE; and
   monitor physical sidelink control channel (PSCCH) continuously when the UE is in the active time, wherein the active time includes time between transmission of a request for information and reception of the requested information.

2. The UE of claim 1, wherein the active time further includes time while one of sl-drx-onDurationTimer, sl-drx-Inactivity Timer or sl-drx-Retransmission Timer is running.

3. The UE of claim 1, wherein the requested information is sidelink-channel state information (SL-CSI).

4. The UE of claim 1, wherein the active time further includes a time while a DRX sidelink-channel state information (SL-CSI) timer is running, wherein a value of the DRX SL-CSI timer is configured by higher layer signaling or determined by SL-CSI latency bound.

5. The UE of claim 4, wherein the at least one processor is further operable to cause the UE to:
   start the DRX SL-CSI timer after transmitting a SL-CSI request plus time T, wherein the time T is configured by higher layer or specified directly, or the time T is zero.

6. A processor for wireless communication, comprising:
   at least one controller coupled with at least one memory and operable to cause the processor to:
   configure discontinuous reception (DRX) functionality for sidelink, wherein the DRX functionality includes a definition of active time for a user equipment (UE); and
   monitor physical sidelink control channel (PSCCH) continuously when the UE is in the active time, wherein the active time includes time between transmission of a request for information and reception of the requested information.

7. The processor of claim 6, wherein the active time further includes time while one of sl-drx-onDurationTimer, sl-drx-InactivityTimer or sl-drx-Retransmission Timer is running.

8. The processor of claim 6, wherein the requested information is sidelink-channel state information (SL-CSI).

9. The processor of claim 6, wherein the active time further includes a time while a DRX sidelink-channel state information (SL-CSI) timer is running, wherein a value of the DRX SL-CSI timer is configured by higher layer signaling or determined by SL-CSI latency bound.

10. The processor of claim 9, wherein the at least one controller is operable to cause the processor to:
    start the DRX SL-CSI timer after transmitting a SL-CSI request plus time T, wherein the time T is configured by higher layer or specified directly, or the time T is zero.

11. A method performed by a user equipment (UE), the method comprising:
    configuring discontinuous reception (DRX) functionality for sidelink, wherein the DRX functionality includes a definition of active time for the UE; and
    monitoring physical sidelink control channel (PSCCH) continuously when the UE is in the active time, wherein the active time includes time between transmission of a request for information and reception of the requested information.

12. The method of claim 11, wherein the active time further includes time while one of sl-drx-onDurationTimer, sl-drx-Inactivity Timer or sl-drx-Retransmission Timer is running.

13. The method of claim 11, wherein the requested information is sidelink-channel state information (SL-CSI).

14. The method of claim 11, wherein the active time further includes a time while a DRX sidelink-channel state information (SL-CSI) timer is running, wherein a value of the DRX SL-CSI timer is configured by higher layer signaling or determined by SL-CSI latency bound.

15. The method of claim 14, further comprising:
    starting the DRX SL-CSI timer after transmitting a SL-CSI request plus time T, wherein the time T is configured by higher layer or specified directly, or the time T is zero.

* * * * *